US008292642B1

(12) United States Patent
Lee et al.

(10) Patent No.: US 8,292,642 B1
(45) Date of Patent: Oct. 23, 2012

(54) CARD CONNECTOR HAVING A TRAY AND A ROTATABLE LEVER

(75) Inventors: Yun-Chien Lee, Taoyuan (TW); Te-Hung Yin, Taoyuan (TW)

(73) Assignee: Proconn Technology Co., Ltd., Taoyuan (TW)

( * ) Notice: Subject to any disclaimer, the term of this patent is extended or adjusted under 35 U.S.C. 154(b) by 0 days.

(21) Appl. No.: 13/206,513

(22) Filed: Aug. 10, 2011

(51) Int. Cl.
*H01R 13/62* (2006.01)

(52) U.S. Cl. .................................................. 439/159

(58) Field of Classification Search .......... 439/157–160, 439/147, 326, 630
See application file for complete search history.

(56) References Cited

U.S. PATENT DOCUMENTS

| | | | | |
|---|---|---|---|---|
| 5,389,001 A * | 2/1995 | Broschard et al. | ............ | 439/159 |
| 6,419,509 B2 * | 7/2002 | Cho | ............... | 439/159 |
| 7,357,678 B1 * | 4/2008 | Lee et al. | ....................... | 439/630 |
| 7,404,727 B1 * | 7/2008 | Lee et al. | ....................... | 439/326 |
| 7,646,866 B2 * | 1/2010 | Lin et al. | ................... | 379/433.12 |
| 7,766,678 B1 * | 8/2010 | Abe | ............................... | 439/159 |
| 7,990,726 B2 * | 8/2011 | Izuhara et al. | ................ | 361/732 |
| 2001/0046799 A1 * | 11/2001 | Cho | .............................. | 439/159 |

\* cited by examiner

*Primary Examiner* — Chandrika Prasad

(74) *Attorney, Agent, or Firm* — Lin & Associates IP, Inc.

(57) ABSTRACT

A card connector includes an insulating housing having a base board of which two sides of a top define two sliding chutes each extending along a front-to-rear direction. A tray has a substantially U-shaped carrying board having two slide boards slidably assembled in the sliding chutes to realize a front-to-rear slide of the tray and a connecting board having one end designed with a locking fillister, two restraining boards and blocking slices protruding upward from side edges and rear edges of the slide boards respectively. A lever has one end designed with a locking section, and the other end pivoted in the other end of the connecting board to make the lever rotatable between a closed position by the locking section being bucked in the locking fillister for holding a card in the tray, and an opened position for the convenience of insertion and extraction of the card.

5 Claims, 5 Drawing Sheets

CARD CONNECTOR HAVING A TRAY AND A ROTATABLE LEVER

BACKGROUND OF THE INVENTION

1. Field of the Invention

The present invention generally relates to an electrical connector, and more particularly to a card connector capable of receiving a card therein.

2. The Related Art

Traditionally, a card connector includes an insulating housing, and a plurality of electrical terminals assembled in the insulating housing. The insulating housing defines a receiving space penetrating through a front thereof for receiving an electronic card therein. Each of the electrical terminals has a contact portion stretching into the receiving space to electrically connect with the electronic card. However, in the process of inserting and extracting the electronic card, the electronic card is apt to be scraped by the insulating housing, and has an unsteady insertion in the receiving space that often results in a poor connection with the contact portions of the electrical terminals. Particularly, when the card connector is sharp shocked, the electronic card easily falls off from the card connector.

SUMMARY OF THE INVENTION

An object of the present invention is to provide a card connector adapted for receiving an external card. The card connector includes an insulating housing having a base board of which two sides of a top are concaved downward to form a pair of sliding chutes each extending along a front-to-rear direction to penetrate through a front of the base board. A tray has a substantially U-shaped carrying board having two slide boards and a connecting board connected between the two slide boards, a pair of restraining boards protruding upward from two opposite side edges of the slide boards, and a pair of blocking slices protruding upward from rear edges of the slide boards. A receiving space is formed among the carrying board, the restraining boards and the blocking slices for receiving the card therein. One end of a front side of the connecting board defines a locking fillister. The slide boards of the carrying board are slidably assembled in the sliding chutes of the base board to realize a front-to-rear slide of the tray with respect to the insulating housing. A lever has one end thereof designed with a locking section, and the other end thereof pivoted in the other end of the front side of the connecting board to make the lever rotatable between a closed position blocking a front of the receiving space by virtue of the locking section being bucked in the locking fillister for holding the card in the tray, and an opened position opening the front of the receiving space for the convenience of insertion and extraction of the card. A terminal assembly is disposed in the insulating housing and further projects beyond the top of the base board to stretch into the receiving space for electrically connecting with the card.

As described above, the card connector of the present invention utilizes the tray to effectively protect the card from being scraped in the process of insertion and extraction thereof. Furthermore, the lever is used to hold the card in the tray, so that effectively avoids the card falling off from the card connector even if the card connector is sharp shocked.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
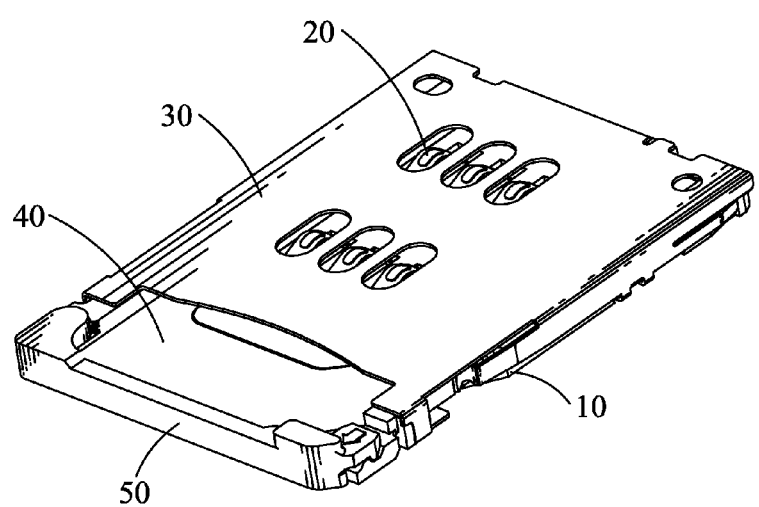
FIG. 1 is an assembled perspective view of a card connector according to the present invention.

With reference to FIG. 1, a card connector according to an embodiment of the present invention includes an insulating housing 10, a terminal assembly 20, a shell 30, a tray 40 and a lever 50.

Figure 2:
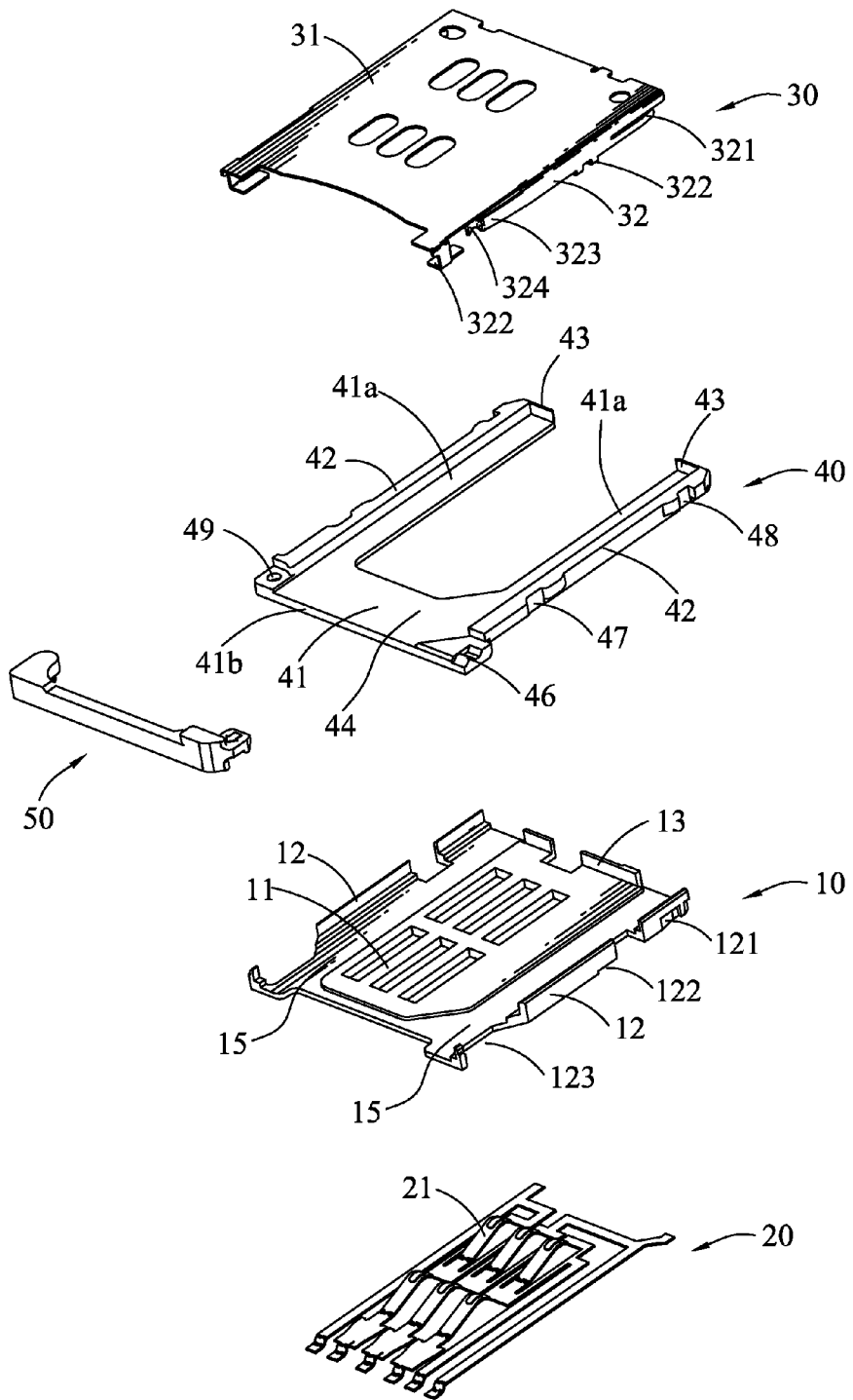
FIG. 2 is an exploded perspective view of the card connector of FIG. 1.
Figure 3:
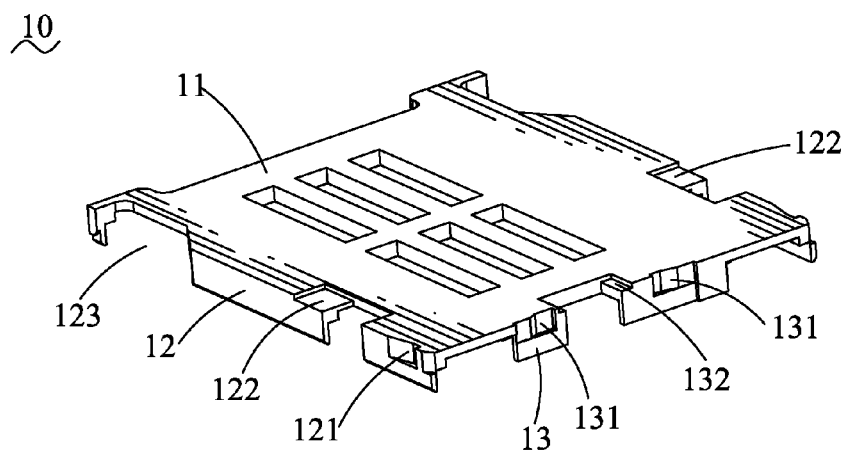
FIG. 3 is a perspective view of an insulating housing of the card connector of FIG. 2.

Referring to FIG. 1, FIG. 2 and FIG. 3, the insulating housing 10 has a flat rectangular base board 11, two side boards 12 protruding upward from two opposite side edges of the base board 11, and a rear board 13 protruding upward from a rear edge of the base board 11. Two sides of a top of the base board 11 adjacent to the side boards 12 are concaved downward to form a pair of sliding chutes 15 each extending along an inserting direction of an external card (not shown) and further penetrating through a front of the base board 11. Each of the side boards 12 has a rear provided with a fastening groove 121 at an outside thereof, a substantial middle and a front respectively provided with a buckling groove 122 at a bottom thereof, and the front further provided with a receiving gap 123 penetrating through the side board 12 to communicate with the corresponding sliding chute 15. The rear board 13 defines two fastening notches 131 spaced from each other at a rear side thereof, and a buckling notch 132 opened between the fastening notches 131 at a bottom thereof. The terminal assembly 20 is molded in the base board 11 of the insulating housing 10 and has a plurality of contact portions 21 elastically projecting upward beyond the top of the base board 11.

Figure 4:
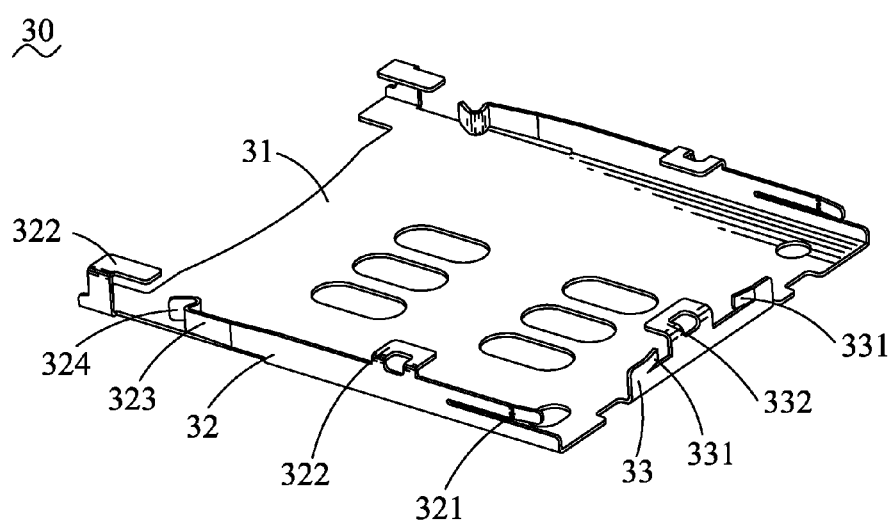
FIG. 4 is a perspective view of a shell of the card connector of FIG. 2.

Referring to FIG. 1, FIG. 2 and FIG. 4, the shell 30 has a flat rectangular base plate 31, two side plates 32 bent downward from both opposite side edges of the base plate 31, and a rear plate 33 bent downward from a rear edge of the base plate 31. Each of the side plates 32 has a rear end punched inward to form an elastic piece 321, a substantial middle and a front end of a bottom edge bent inward to respectively form a buckling piece 322, and a front cut off from the base plate 31 to form an elastic arm 323 of which a free end is arched inward to form a locking portion 324. The rear plate 33 defines a pair of elastic flakes 331 slanted forward, and a buckling flake 332 bent forward from a bottom edge thereof between the elastic flakes 331. The shell 30 is coupled onto the insulating housing 10, by means of the elastic flakes 331 being buckled in the fastening notches 131, the buckling flake 332 being buckled in the buckling notch 132, the elastic pieces 321 being buckled in the fastening grooves 121, and the buckling pieces 322 being buckled in the buckling grooves 122, respectively. The locking portions 324 elastically stretch into the sliding chutes 15 through the respective receiving gaps 123 face-to-face.

Figure 6:
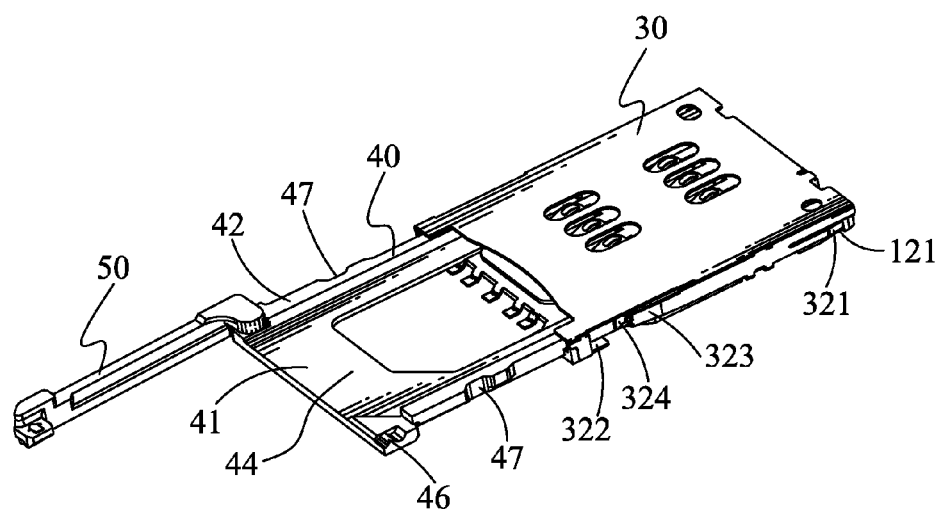
FIG. 6 is a perspective view showing that the card connector of FIG. 1 has a tray thereof pulled out and the lever opened.

Referring to FIG. 1, FIG. 2 and FIG. 6, the tray 40 has a substantially U-shaped carrying board 41 which has two slide boards 41a and a connecting board 41b connected between the two slide boards 41a, a pair of restraining boards 42 protruding upward from two opposite side edges of the slide boards 41a, and a pair of blocking slices 43 protruding upward from rear edges of the slide boards 41a. Accordingly, a receiving space 44 is formed among the carrying board 41, the restraining boards 42 and the blocking slices 43 for receiving the card therein. Two ends of a front side of the connecting board 41b are designed with a pivot hole 49 and a locking fillister 46 respectively. Two opposite outsides of the restraining boards 42 each define a first positioning fillister 47 at a front thereof and a second positioning fillister 48 at a rear thereof. The tray 40 is slidably inserted rearward between the base plate 31 of the shell 30 and the base board 11 of the insulating housing 10, by virtue of the slide boards 41a being slidably disposed in the sliding chutes 15. The contact portions 21 of the terminals assembly 20 stretch into the receiving space 44 to electrically connect with the card. The locking portions 324 of the shell 30 can be buckled in the second positioning fillisters 48 of the tray 40 to realize an opened condition of the tray 40, and buckled in the first positioning fillisters 47 to realize a closed condition of the tray 40.

Figure 5:
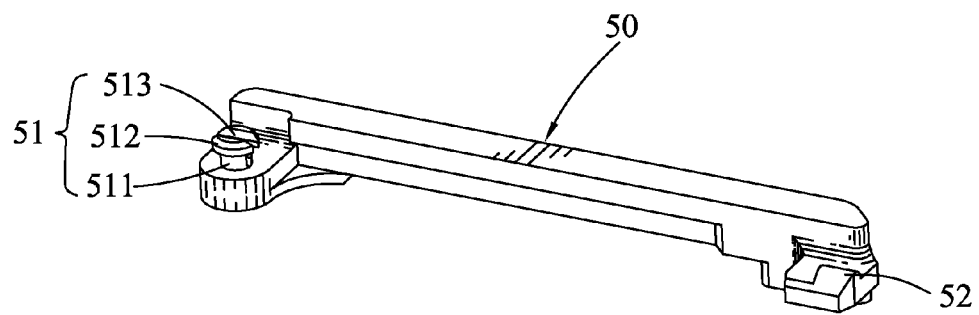
FIG. 5 is a perspective view of a lever of the card connector of FIG. 2.
Figure 7:
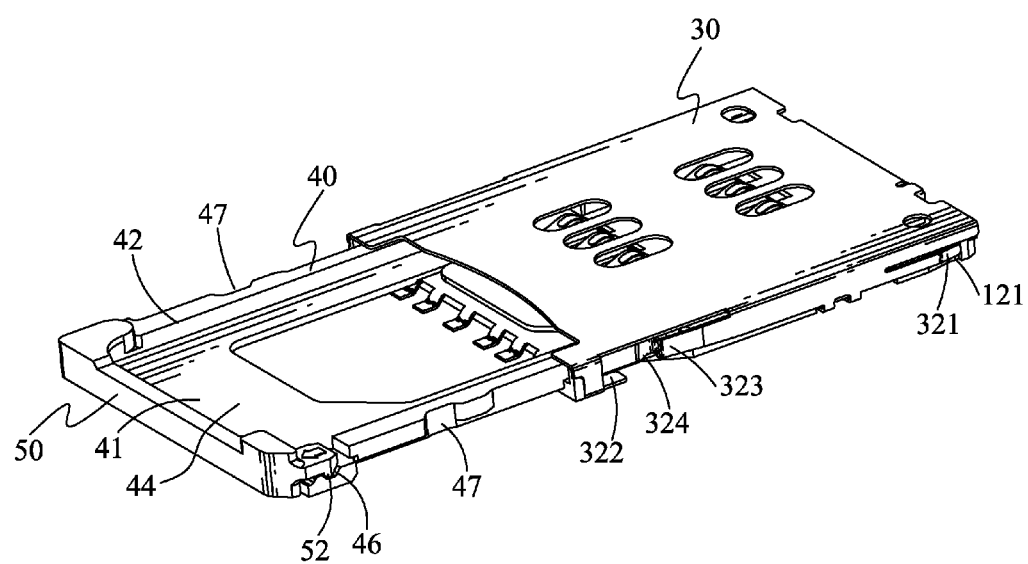
FIG. 7 is a perspective view showing that the card connector of FIG. 1 has the tray thereof pulled out and the lever closed.

Referring to FIG. 5, FIG. 6 and FIG. 7, the lever 50 has two ends thereof designed with a locking section 52 and a pivot section 51 respectively. The pivot section 51 includes a pivot pillar 511, a fastening cap 512 protruding outward from a periphery edge of a bottom end of the pivot pillar 511, and an elastic slot 513 penetrating through the fastening cap 512 and the pivot pillar 511 along an axis and a diameter direction of the pivot pillar 511 for realizing an elasticity of the pivot section 51. The lever 50 is rotatably assembled to a front of the tray 40 by means of the pivot pillar 511 being inserted in the pivot hole 49 and the fastening cap 512 resisting against a bottom of the carrying board 41, so that the lever 50 is rotatable between a closed position blocking a front of the receiving space 44 by virtue of the locking section 52 being bucked in the locking fillister 46 for holding the card in the tray 40, and an opened position opening the front of the receiving space 44 for the convenience of insertion and extraction of the card.

Referring to FIGS. 1-7, when the card needs to be inserted into the card connector having the tray 40 in the closed condition, namely the locking portions 324 of the shell 30 are buckled in the first positioning fillisters 47 of the tray 40, pick one end of the lever 50 with direction mark to make the locking section 52 freed from the locking fillister 46 of the tray 40. Then, rotate the lever 50 to open the front of the receiving space 44 for the convenience of the insertion of the card into the receiving space 44. After the card is completely inserted in the receiving space 44 of the tray 40, close the lever 50 until the locking section 52 is buckled in the locking fillister 46 again so as to hold the card in the card connector to realize a steady connection between the card and the contact portions 21 of the terminal assembly 20. When the card needs to be inserted into the card connector, the tray 40 may be also pulled forward to make the locking portions 324 of the shell 30 freed from the first positioning fillister 47 until the locking portions 324 are buckled in the second positioning fillisters 48, namely the tray 40 is pulled forward out to realize the opened condition. After the card is held in the tray 40 by the lever 50, push the tray 40 together with the card rearward to realize the closed condition so as to achieve the electrical connection between the card and the terminal assembly 20.

When the card needs to be withdrawn from the card connector, open the lever 50 and then hold the lever 50 to pull out the tray 40 with the card until the tray 40 is in the opened condition. At this time, remove the card forward out of the tray 40. After the card is removed out of the tray 40, close the lever 50 and then push the lever 50 rearward to make the tray 40 in the closed condition again.

As described above, the card connector of the present invention utilizes the tray 40 to effectively protect the card from being scraped in the process of insertion and extraction thereof. Furthermore, the cooperation of the locking portions 324 of the shell 30 and the positioning fillisters 47, 48 can make the tray 40 steadily positioned in the closed condition and the opened condition, and the lever 50 is further used to hold the card in the tray 40, so that effectively avoid the card falling off from the card connector even if the card connector is sharp shocked.

What is claimed is:

1. A card connector adapted for receiving an external card, comprising:
   an insulating housing having a base board of which two sides of a top are concaved downward to form a pair of sliding chutes each extending along a front-to-rear direction to penetrate through a front of the base board;
   a tray having a substantially U-shaped carrying board which has two slide boards and a connecting board connected between the two slide boards, a pair of restraining boards protruding upward from two opposite side edges of the slide boards, and a pair of blocking slices protruding upward from rear edges of the slide boards, a receiving space being formed among the carrying board, the restraining boards and the blocking slices for receiving the card therein, one end of a front side of the connecting board defining a locking fillister, the slide boards of the carrying board being slidably assembled in the sliding chutes of the base board to realize a front-to-rear slide of the tray with respect to the insulating housing;
   a lever having one end thereof designed with a locking section, and the other end thereof pivoted in the other end of the front side of the connecting board to make the lever rotatable between a closed position blocking a front of the receiving space by virtue of the locking section being bucked in the locking fillister for holding the card in the tray, and an opened position opening the front of the receiving space for the convenience of insertion and extraction of the card; and
   a terminal assembly disposed in the insulating housing and further projecting beyond the top of the base board to stretch into the receiving space for electrically connecting with the card.

2. The card connector as claimed in claim 1, wherein the other end of the front side of the connecting board of the tray defines a pivot hole, the other end of the lever defines a pivot section including a pivot pillar inserted in the pivot hole, a fastening cap protruding outward from a periphery edge of a bottom end of the pivot pillar for passing through the pivot hole to resist against a bottom side of the connecting board, and an elastic slot penetrating through the fastening cap and the pivot pillar to realize an elasticity of the pivot section.

3. The card connector as claimed in claim 1, wherein two opposite outsides of the restraining boards of the tray each define a first positioning fillister at a front thereof and a second positioning fillister at a rear thereof, the card connector further includes a shell having a base plate and two side plates bent downward from both opposite side edges of the base plate, a front of each side plate is cut off from the base plate to form an elastic arm of which a free end is arched inward to form a locking portion, the shell is coupled onto the insulating housing with the locking portions being capable of being buckled in the second positioning fillisters of the tray to position an opened condition of the tray, and buckled in the first positioning fillisters to position a closed condition of the tray, in the process of the tray sliding from front to rear.

4. The card connector as claimed in claim 3, wherein two opposite side edges of the base board of the insulating housing protrude upward to form two side boards of which each has a rear provided with a fastening groove at an outside thereof, a substantial middle and a front respectively provided with a buckling groove at a bottom thereof, and the front further provided with a receiving gap penetrating through the side board to communicate with the corresponding sliding chute, each side plate of the shell has a rear end punched inward to form an elastic piece buckled in the fastening groove, a substantial middle and a front end of a bottom edge bent inward to respectively form a buckling piece buckled in the buckling groove, the locking portions elastically stretch into the sliding chutes through the respective receiving gaps face-to-face for positioning the tray.

5. The card connector as claimed in claim 3, wherein a rear edge of the base board of the insulating housing protrudes upward to form a rear board which defines two fastening notches spaced from each other at a rear side thereof and a buckling notch opened between the fastening notches at a bottom thereof, a rear edge of the base plate of the shell is bent downward to form a rear plate which defines a pair of elastic flakes slanted forward to be buckled in the fastening notches, and a buckling flake bent forward from a bottom edge thereof between the elastic flakes to be fastened in the buckling notch.

\* \* \* \* \*